May 5, 1925.  1,536,168
H. R. TRAPHAGEN
TWO-ROW CULTIVATOR
Filed July 9, 1923  3 Sheets-Sheet 2

INVENTOR.
Harry R. Traphagen
By Wilson & McCanna
ATTYS.

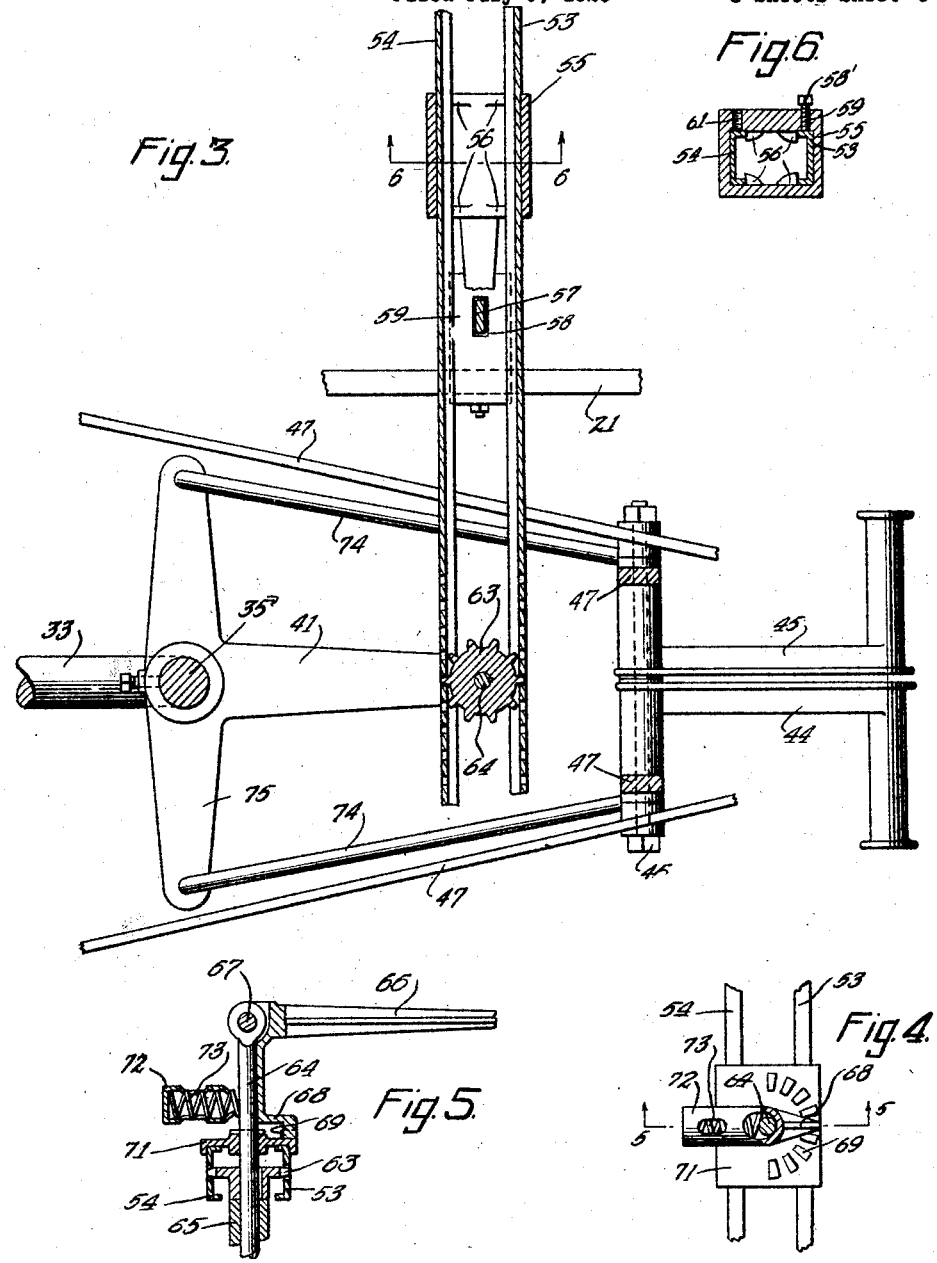

Patented May 5, 1925.

1,536,168

UNITED STATES PATENT OFFICE.

HARRY R. TRAPHAGEN, OF ROCKFORD, ILLINOIS, ASSIGNOR TO EMERSON-BRANTINGHAM COMPANY, OF ROCKFORD, ILLINOIS, A CORPORATION OF ILLINOIS.

TWO-ROW CULTIVATOR.

Application filed July 9, 1923. Serial No. 650,311.

*To all whom it may concern:*

Be it known that I, HARRY R. TRAPHAGEN, a citizen of the United States, residing at Rockford, in the county of Winnebago and State of Illinois, have invented certain new and useful Improvements in Two-Row Cultivators, of which the following is a specification.

This invention relates to two row cultivators of the type disclosed in United States Letters Patent No. 1,170,584, dated Feb. 8, 1916 and No. 1,279,049, dated Sept. 17, 1918, characterized by an arch structure which connects and holds the dirigible frame-supporting wheels in parallel relation and to which the cultivator beams are attached, said arch structure being adapted to be shifted laterally for steering, and to be oscillated forwardly and backwardly for raising and lowering the forward end of the cultivator beams.

In the present invention, I have aimed primarily to improve cultivators of this type by the provision of novel means for connecting the several pairs of cultivator beams so that they may be quickly and conveniently adjusted as to width of the rows and proximity to the plants in each row. My improvements in this respect are applicable also to other types of cultivators, as will be apparent hereinafter.

I have also aimed to provide in a two row cultivator improved means for effecting the lateral adjustment of the beams mentioned in connection with the steering means, whereby the beams will be positively shifted in the direction of steering, thus facilitating the steering operation and improving the control and sensitiveness of the implement in regard to steering.

Another object is to provide a simplified construction for accomplishing the foregoing objects, and one which may be produced at a comparatively low cost.

Other objects and attendant advantages will be appreciated by those skilled in this art as the invention becomes better understood by reference to the following description when considered in connection with the accompanying drawings, in which—

Figure 2:
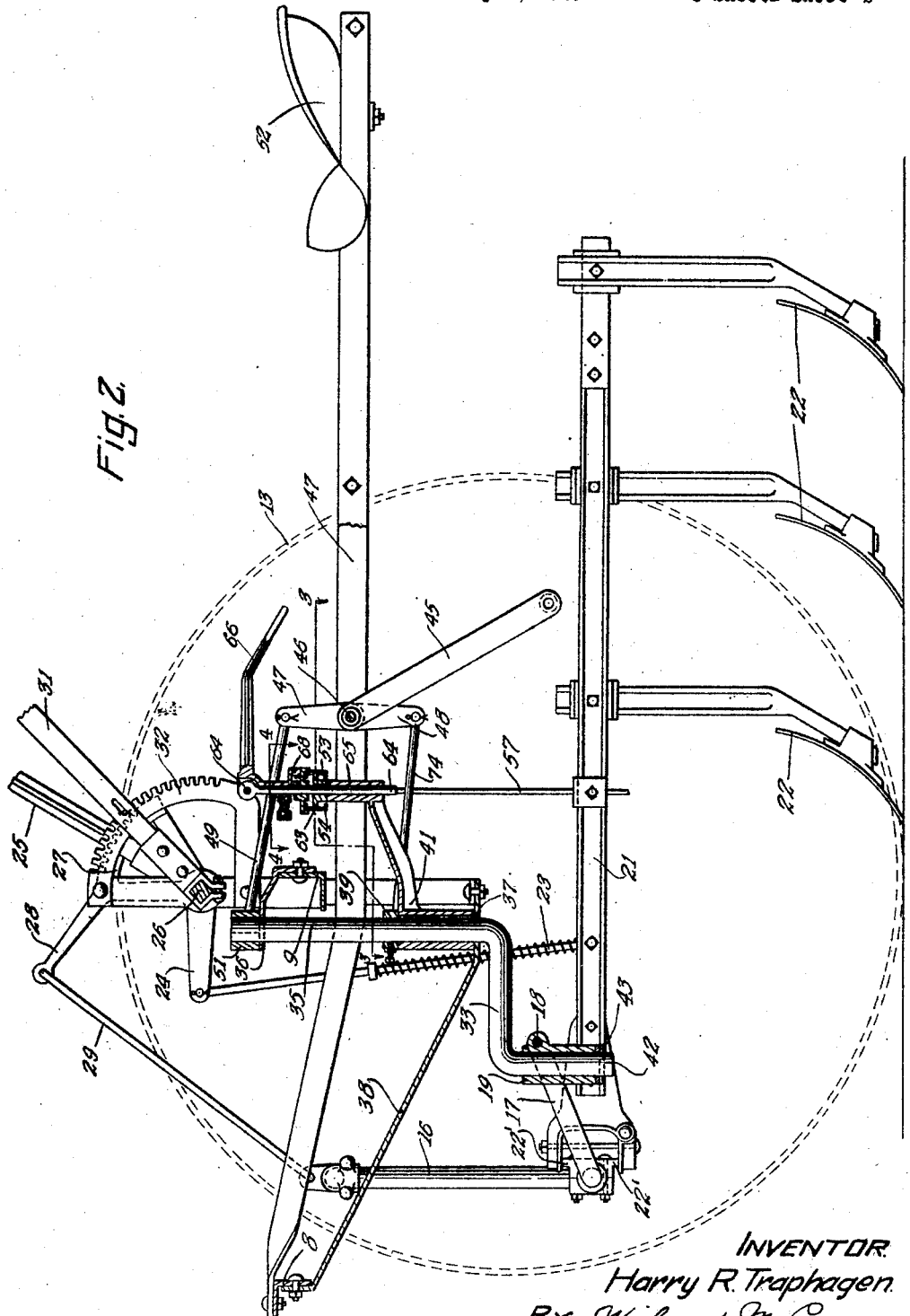
Fig. 2 is a vertical sectional view taken substantially on the line 2—2 of Fig. 1.

Figs. 3 and 4 are enlarged fragmentary, horizontal plan sections taken substantially on the lines 3—3 and 4—4, respectively, of Fig. 2;

Fig. 5 is a section taken on the line 5—5 of Fig. 4; and

Fig. 6 is a section taken on the line 6—6 of Fig. 3.

Inasmuch as my invention relates primarily to the connection between the cultivator beams for holding them in laterally spaced relation and for changing this relation, and to the means for shifting the beams in connection with steering, I have illustrated in the drawings, only such parts of a cultivator as are necessary for an understanding of the features referred to, and reference may therefore, be had to the above mentioned patents for a more thorough understanding of the particular type of cultivator to which my present invention is applied. It should be understood, however, as already mentioned, that my present improvements are not limited to use on this particular type of cultivator, but are applicable in certain respects to other types of two row cultivators.

Referring to the drawings, the frame consists of front and rear cross-bars 8 and 9, respectively, the former having rearwardly turned ends 11, the ends of both bars at each side of the implement being bolted to a spindle bracket 12. The frame is carried by wheels 13 each of which has a vertical spindle 14 journaled in the adjacent bracket 12, and are thus dirigible. In this particular type of cultivator the wheels are connected by an arch structure comprising a pair of arches 15 and 16 which have rearwardly turned ends 17. The inner ends are pivotally connected at 18 to an interposed bracket 19 and the outer ends are connected through ball and socket joints, not shown, in alignment with the pivot bolt 18 to forwardly projecting arms fixed to the respective wheel spindles, as shown in the above mentioned patents. This arch structure holds the wheels in parallel relation and is adapted to be shifted laterally for angling the wheels for steering.

To each arch is attached a pair of cultivator beams of any suitable or preferred construction for cultivating the interposed row of plants. In the present instance, each cultivator beam designated generally by 21, equipped with suitable earth-working shovels 22, is pivotally mounted at its forward end on a horizontal portion of its respective arch with capacity for adjustment lengthwise thereon, but held against such movement when set in an operative position and with capacity to swing vertically at its rear end upon said arch portion as a fulcrum and horizontally about a vertical axis indicated by bearing studs 22'.

Each cultivator beam is supported in an operative position by a pendent rod 23 connected by an arm 24 to an adjusting lever 25, which is loose on a rock shaft 26 and adapted to be connected by the usual latch connection to a quadrant 27 fixed to said shaft. This quadrant carries a forwardly projecting arm 28 connected by a link 29 to the upper end of the adjacent arch. Said shaft is adapted to be rocked by means of a lever 31 which co-operates with a fixed quadrant 32. In this particular cultivator, each cultivator beam is connected with the rock shaft 26 through the agency of a lever and quadrant and connections therefrom similar to the lever 25 and quadrant 27 described. Consequently, by operation of the lever 31, all of the cultivator beams may be raised and lowered simultaneously, or each beam may be independently raised and lowered or vertically adjusted by operation of its respective lever 25. This type of beam raising and lowering device is disclosed in Patent No. 1279049 mentioned above.

In the preferred embodiment of my invention, I employ a crank member designated generally by 33, for shifting the arch structure laterally for steering. This member has a pivoted portion 35 mounted on a vertical axis in upper and lower bearings 36 and 37 respectively, suitably attached to the frame, the member providing the bearing 37 being in the form of a brace rod 38 connected to the front frame bar 8. A set collar 39 fixed to the crank portion 35 and resting on a crank arm 41 which will be later described, supports the crank member in operative position. The free end 42 of said crank member is turned downwardly and has a bearing in the bracket 19 above referred to. By oscillating the crank member, the arch structure will be shifted laterally for steering and simultaneously shifting the forward ends of the cultivator beams, as will be obvious. A pin 43 through the crank end 42 holds the bracket 19 in position thereon.

Foot-operated means is provided for oscillating the crank member 33 comprising a pair of foot levers 44 and 45 pivotally suspended from a bolt 46 carried by the seat bars 47, which in turn are fixed to the frame. Cast integral with the pivoted end of each foot lever is an upwardly and a downwardly reaching arm 47 and 48, respectively, the former of which is pivotally connected by a link 49 to the adjacent end of a cross-head lever 51, fixed to the upper end of the pivot portion 35 of the crank member 33. By reason of this construction the operator seated on the seat 52, may press forwardly on either foot lever, to thereby swing the crank member 33 and angle the wheels and shift the cultivator beams. The lever 44 is for steering to the left and the lever 45 to the right, as will be obvious.

The cultivator beams are respectively connected at a medial point by means which holds them in spaced relation and is employed to change this relation to accommodate them to wider or narrower rows, or to vary their proximity to the plants. My invention contemplates the provision of means for optionally connecting together either each inner beam of one pair with the outer beam of the other pair, or both beams of each pair, and for relatively adjusting such connected pair of beams laterally with respect to the frame. When the connected pairs of beams referred to comprise the inner beam of one pair and the outer beam of the other, relative adjustment of such pairs is for varying the proximity of the respective beams to the plants without changing the relation of the beams to the distance between the rows; and in the other instance, wherein both beams of each pair are connected together, relative adjustment of such connected pairs changes the spacing of the beams for wider or narrower rows. This phase of my invention may be employed in cultivators either independently of or in conjunction with the steering mechanism above described, and in the present instance I have shown it operatively connected with such mechanism.

The beam-connecting means may be constructed in various ways, and in its preferred embodiment comprises a pair of cross-bars 53 and 54, each permanently connected with one of the outer beams and adapted to be optionally connected to one or the other of the inner beams. To this end, the inner beam of each pair is adapted to be connected to either one or the other of said cross-bars through the agency of a bracket designated generally by 55 embracing said cross-bars and having lugs 56 for holding them in spaced relation as shown in Fig. 6. Each of these brackets has attached thereto a depending bar 57 slidable freely through an opening 58 in a casting 59 fixed to the adjacent beam. By this means, movement of the bracket 55 transversely to the line of draft as when connected to and moved by either of the cross rods 53 or 54 transmits similar movement to its respective beams and the latter at all times is free to move vertically with respect to its rod 57 and parts connected thereto. A set screw 58' is employed for securing each bracket 55 to either of the cross-bars, this being accomplished by insertion of said set screw in either of the holes 59 and 61 in said bracket, as will be obvious. When this bracket is fixed to one cross-bar, the other is free to slide lengthwise therethrough. Each cross-bar has permanently but adjustably attached to its outer end a bracket 62 which is connected to the beam below by a depending rod similar to the connection of each bracket 55 with its respective beam. One or more guides 60 attached to the frame may be employed for slidably supporting each cross-bar, although as will be presently apparent the cross-bars have an additional support at the center of the frame.

Figure 1:
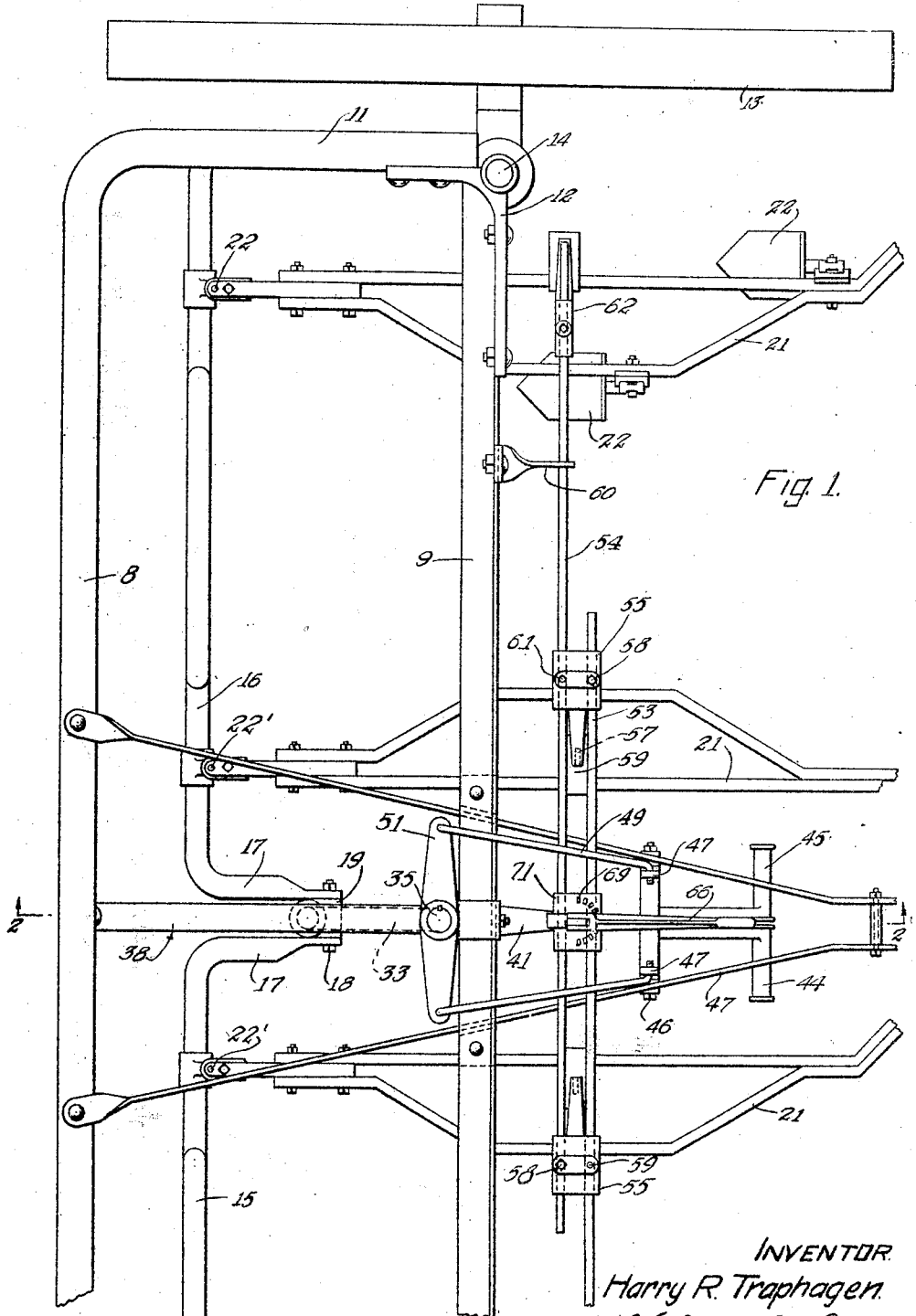
Figure 1 is a fragmentary plan view of a two-row cultivator embodying my invention.

As shown plainly in Figs. 3 and 5, there is a toothed wheel or gear 63 interposed between and meshing with the cross-bars 53 and 54, this gear being fixed to a shaft 64 which is journaled in the free end 65 of the crank arm 41 above mentioned. By imparting rotative movement to this shaft and consequently the gear, the cross-rods 53 and 54 will be moved lengthwise in opposite directions. When both beams of each pair are connected to one of the cross-bars, the beams of such pair will be moved outwardly or inwardly in unison, according to the direction of movement of its respective cross-bar; and when the beams are connected in the manner shown in Fig. 1, that is, with the inner beam of each pair connected to the other cross-bar, the beams of each pair will be moved in opposite directions with and by movement of the cross-bars. Thus, with the parts connected as shown, when the gear 63 is turned in a clockwise direction, viewing Fig. 3, the outer beam at the right hand side of the machine (upper side viewing Fig. 1) will be swung outwardly and its companion inner beam will be simultaneously swung inwardly, thus withdrawing the shovels of both pairs of beams from the row of plants; and by turning the gear 63 in the reverse direction the beams of this pair will be swung toward each other closer to the plants. The beams at the other side of the implement will be simultaneously and similarly moved. It will be manifest that by transposing the set screws 58 both of the beams of the pair at the right hand side of the implement will be moved outwardly when the gear 63 is turned in a clockwise direction, thereby accommodating the beams to wider spacing of the rows, and vice versa.

I have provided a means for quickly and conveniently adjusting the cross-bars 53 and 54 in the manner described, this means comprising a hand lever 66 pivotally mounted at 67 on the upper end of the shaft 64, and having a depending arm 68 adapted to be brought into and out of location between the upstanding teeth 69 on a quadrant bracket 71 resting on top of the cross-bars and held in position by the shaft 64. The depending arm of this bell crank lever 66—68 has an extension 72 carrying a compression spring 73 which bears against the shaft 64 and urges said lever to a locked position in connection with the quadrant teeth 69. It will be manifest that after disconnection of the hand lever 66—68 from the quadrant teeth 69 against pressure of the spring 73, said lever may be swung laterally in either direction for shifting the cross-bars and may be connected to the quadrant bracket 71 in any adjusted position, thereby retaining and holding the beams in the position to which they have been adjusted. The lever 66 being centrally disposed and within convenient reach of the operator, affords a practical means for quickly and easily shifting the beams in the manner described.

In order to positively shift the rear ends of the beams laterally together with their forward ends when the arch structure is shifted for steering or dodging, I have connected the crank arm 41 to the foot levers 44 and 45, this connection being established by means of a link 74 between each depending lever arm 48 and the adjacent end of a cross-head lever 75 integral with the pivoted end of the crank arm 41. In view of this construction, the crank arm 41 will be oscillated simultaneously with but in the opposite direction from that of the crank member 33, so that the beams will be shifted laterally in the same direction at their front and rear ends. For example, by pressing forwardly on the foot lever 45, the crank member 33 will be oscillated in a clockwise direction viewing Fig. 1, thereby shifting the forward ends of the beams to the right and the crank arm 41 will be oscillated in a counter-clockwise direction, thereby shifting the cross-bars 53 and 54 and the rear ends of the beams to the right.

It is believed that the foregoing conveys a clear understanding of the objects prefaced above, and it should be understood that while I have shown for the purpose of illustration but a single working embodiment of my invention, various changes might be made in the construction and arrangement without departing from the spirit and scope of the invention as expressed in the appended claims.

I claim:

1. In a two row cultivator, the combination of a frame supported by dirigible wheels, a pair of laterally shiftable arches connecting the wheels, a crank member connected to the arches for shifting them, two pairs of cultivator beams, means for optionally connecting together either each inner beam of one pair with the outer beam of the other pair or both beams of each pair and for relatively adjusting such connected pairs of beams laterally with respect to the frame, a pair of foot levers, and connections between each foot lever and said crank member and said beam-connecting means for simultaneously oscillating said member and shifting said means.

2. In a two row cultivator, the combination of a frame supported by dirigible wheels, a pair of laterally shiftable arches connecting the wheels, a crank member connected to the arches for shifting them, two pairs of cultivator beams, means for optionally connecting together either each inner beam of one pair with the outer beam of the other pair or both beams of each pair and for relatively adjusting such connected pairs of beams laterally with respect to the frame, and means operable at the will of the operator connected to said crank member and said beam-connecting means for simultaneously oscillating said member and shifting said beam-connecting means.

3. In a two row cultivator, the combination of a frame supported by dirigible wheels, a pair of laterally shiftable arches connecting the wheels, a crank member connected to the arches for shifting them, two pairs of cultivator beams, means for optionally connecting together either each inner beam of one pair with the outer beam of the other pair or both beams of each pair and for relatively adjusting such connected pairs of beams laterally with respect to the frame, and means operable at the will of the operator connected to said crank member and said beam-connecting means for simultaneously oscillating said member and shifting said beam-connecting means, said crank member being oscillated by shifting the arches in the same direction that said beam-connecting means are shifted.

4. In a two row cultivator, the combination of a frame supported by dirigible wheels, means connecting said wheels for holding them in parallelism, a crank member for moving said means for steering, two pairs of cultivator beams, means for optionally connecting together either each inner beam of one pair with the outer beam of the other pair or both beams of each pair and for relatively adjusting such connected pairs of beams laterally with respect to the frame, and foot operable means connected with said crank member and said beam-connecting means for oscillating the crank and directly moving said beam-connecting means, whereby to simultaneously angle the wheels and shift the beams laterally in the same direction.

5. In a two row cultivator, the combination of a frame supported by dirigible wheels, means connecting the wheels for steering, two pairs of cultivator beams, means for optionally connecting together either each inner beam of one pair with the outer beam of the other pair or both beams of each pair and for relatively adjusting such connected pairs of beams laterally with respect to the frame, and control means operable at the will of the operator and connected with said wheel steering means and said beam-connecting means for positively and simultaneously angling the wheels and shifting the beams laterally in the same direction.

6. In a two row cultivator, the combination with the cultivator beams, a pair of cross-bars, means connecting one outer beam to one cross-bar and the other outer beam to the other cross-bar, means for connecting each inner beam to either one or the other of said cross-bars, and means operatively associated with said cross-bars for relatively moving them crosswise of the cultivator, whereby to relatively adjust the beams of each pair to and from its row of plants when connected to both cross-bars and whereby to adjust said beams in unison to accommodate rows of different widths when connected to a single cross-bar.

7. In a two row cultivator, the combination with the cultivator beams, a pair of cross-bars, means connecting the outer beam to one cross-bar and the other outer beam to the other cross-bar, means for connecting each inner beam to either one or the other of said cross-bars, a gear interposed between and meshing with said cross-bars, and means for imparting rotative movement to the gear and for holding it in any of a plurality of rotarily adjusted positions.

8. In a two row cultivator, the combination with the cultivator beams, a pair of cross-bars, each adapted to be connected to either one of the beams of each pair or both beams of one pair, a gear interposed and meshing with both cross-bars, means for imparting rotative movement to the gear for relatively shifting said cross-bars, and means for holding the cross-bars in any adjusted position.

9. In a two row cultivator, the combination with the cultivator beams, a pair of cross-bars, each adapted to be connected to either one of the beams of each pair or both beams of one pair, a gear interposed and meshing with both cross-bars, a shaft fixed to the gear, a lever pivoted on said shaft and adapted for turning the gear, and a quadrant with which said lever co-operates.

10. In a two row cultivator, the combination with the cultivator beams, a pair of cross-bars, means connecting one outer beam to one cross-bar and the other outer beam to the other cross-bar, a bracket connected to each inner beam and slidably associated with both cross-bars, means for securing each bracket to either cross-bar, a gear interposed between and meshing with said cross-bars, and means for imparting rotative movement to said gear.

11. In a two row cultivator, the combination of a frame supported by dirigible wheels, means connecting the wheels for steering, two pairs of cultivator beams, a pair of cross-bars, means connecting one outer beam to one cross-bar and the other outer beam to the other cross-bar, a bracket connected to each inner beam and slidably associated with both cross-bars, means for securing each bracket to either of said cross-bars, and means for shifting said cross-bars laterally with said wheel-steering means.

12. In a two row cultivator, the combination of a frame supported by dirigible wheels, means connecting said wheels for steering, two pairs of cultivator beams, a pair of cross-bars, means connecting one outer beam to one cross-bar and the other outer beam to the other cross-bar, a bracket connected to each inner beam and slidably associated with said cross-bars, means for securing each bracket to either of said cross-bars, and steering means operable by the operator connected with said wheel-steering means and said cross-bars for shifting them laterally in unison.

13. In a two row cultivator, the combination of a frame supported by dirigible wheels, means connecting the wheels for steering, two pairs of cultivator beams, means adapted to be connected either to one of the beams of each pair or both beams of one pair for holding them in spaced relation and for shifting them laterally in such relation, and steering means operable by the operator connected to said wheel-steering means and said beam-connecting means for moving them laterally in unison.

14. In a two row cultivator, the combination of a frame supported by dirigible wheels, an arch structure connecting the wheels for steering, a crank member for shifting the arch structure laterally, two pairs of cultivator beams connected to said arch structure, a pair of cross-bars, means connecting one outer beam to one cross-bar and the other outer beam to the other cross-bar, a bracket connected to each inner beam and slidably associated with said cross-bars, means for securing each bracket to either of said cross-bars, means for adjusting said cross-bars lengthwise with respect to each other, and steering means operable by the operator connected to said crank member and said cross-bars for simultaneously oscillating the crank member and shifting said arch structure and cross-bars laterally.

15. In a two row cultivator, the combination of a frame supported by dirigible wheels, an arch structure connecting the wheels for steering, a crank member for shifting the arch structure laterally, two pairs of cultivator beams connected to said arch structure, a pair of cross-bars, means connecting one outer beam to one cross-bar and the other outer beam to the other cross-bar, a bracket connected to each inner beam and slidably associated with said cross-bars, means for securing each bracket to either of said cross-bars, means for adjusting said cross-bars lengthwise with respect to each other, a pair of foot levers, and connections between each foot lever and said crank member and said cross-bars, whereby to shift the arch structure and cross-bars laterally in the same direction.

HARRY R. TRAPHAGEN.